United States Patent [19]

Hosoya et al.

[11] Patent Number: 5,035,624

[45] Date of Patent: Jul. 30, 1991

[54] PRESENTATION APPARATUS

[75] Inventors: Rituko Hosoya, Kamakura; Takahiro Yamada; Masataka Musya, both of Yokohama, all of Japan

[73] Assignee: Hitachi, Ltd., Tokyo, Japan

[21] Appl. No.: 487,126

[22] Filed: Mar. 2, 1990

[30] Foreign Application Priority Data

Mar. 6, 1989 [JP] Japan .................................... 1-51929

[51] Int. Cl.⁵ ...................... G11B 27/00; G09B 5/00
[52] U.S. Cl. .................................. 434/309; 360/72.1; 360/72.2; 360/72.3
[58] Field of Search ................ 434/307, 309; 364/518, 364/900; 360/72.1, 72.2, 72.3

[56]  References Cited

U.S. PATENT DOCUMENTS

| | | | |
|---|---|---|---|
| 3,601,553 | 8/1971 | Cooper | 360/72.1 |
| 3,987,484 | 10/1976 | Bosche et al. | 434/307 X |
| 4,210,785 | 7/1980 | Huber et al. | 360/72.2 X |
| 4,449,198 | 5/1984 | Kroon et al. | 364/900 |
| 4,591,931 | 5/1986 | Baumeister | 360/72.1 |
| 4,689,022 | 8/1987 | Peers et al. | 434/307 |

Primary Examiner—Richard J. Apley
Assistant Examiner—Glenn E. Richman
Attorney, Agent, or Firm—Antonelli, Terry, Stout & Kraus

[57]  ABSTRACT

A presentation apparatus which can automatically adjust the total presentation time and presentation time intervals of a video material according to user's desired total presentation time so that the video material necessary for presentation can be screened within the desired total presentation time. The user inputs the desired total presentation time to the presentation apparatus. In the apparatus, the desired total presentation time is compared with a standard total presentation time to find a difference therebetween as an adjustment time. One of adjusting methods is selected on the basis of the found adjustment time. A data indicative of the selected adjusting method is stored in an adjustment memory.

17 Claims, 17 Drawing Sheets

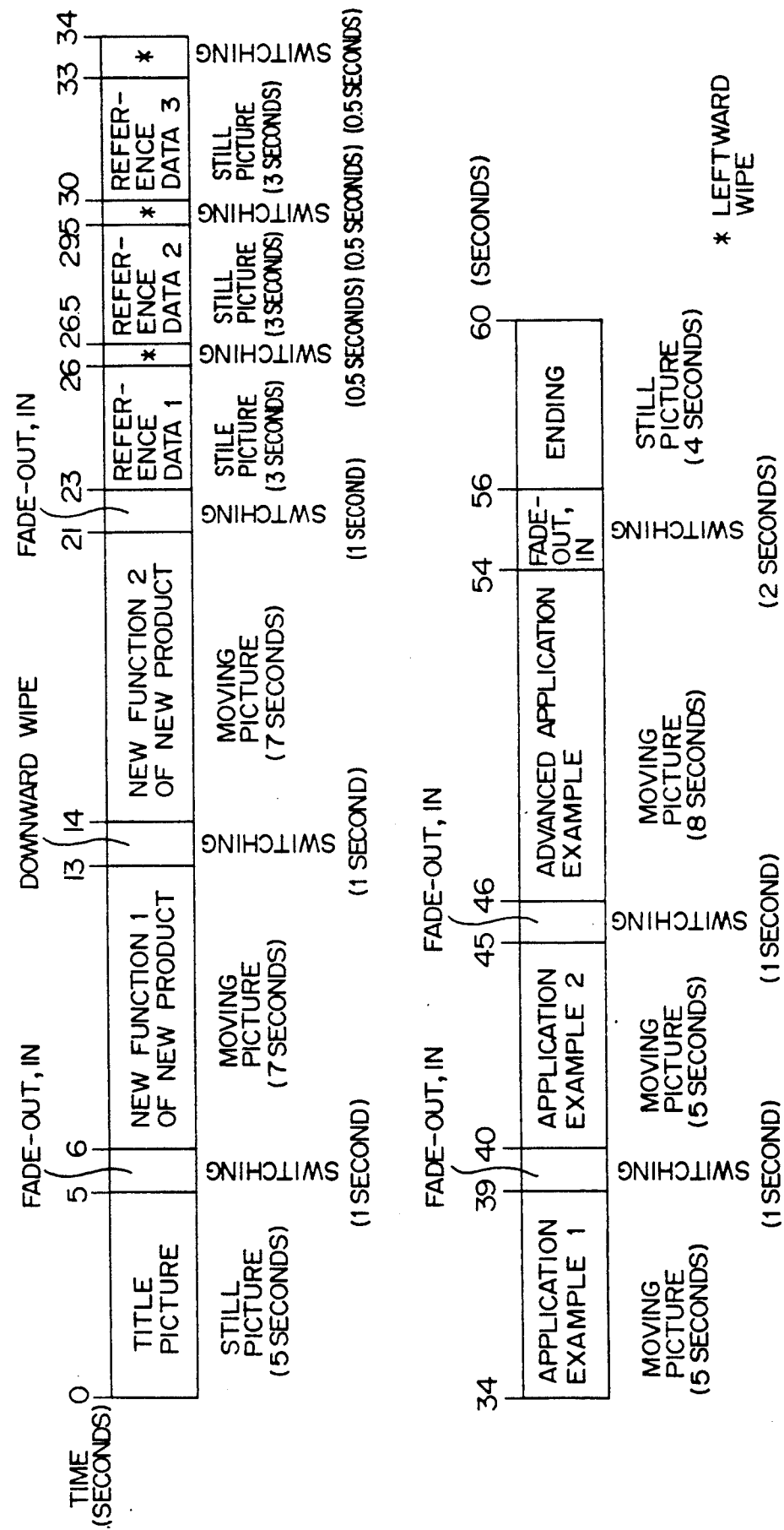

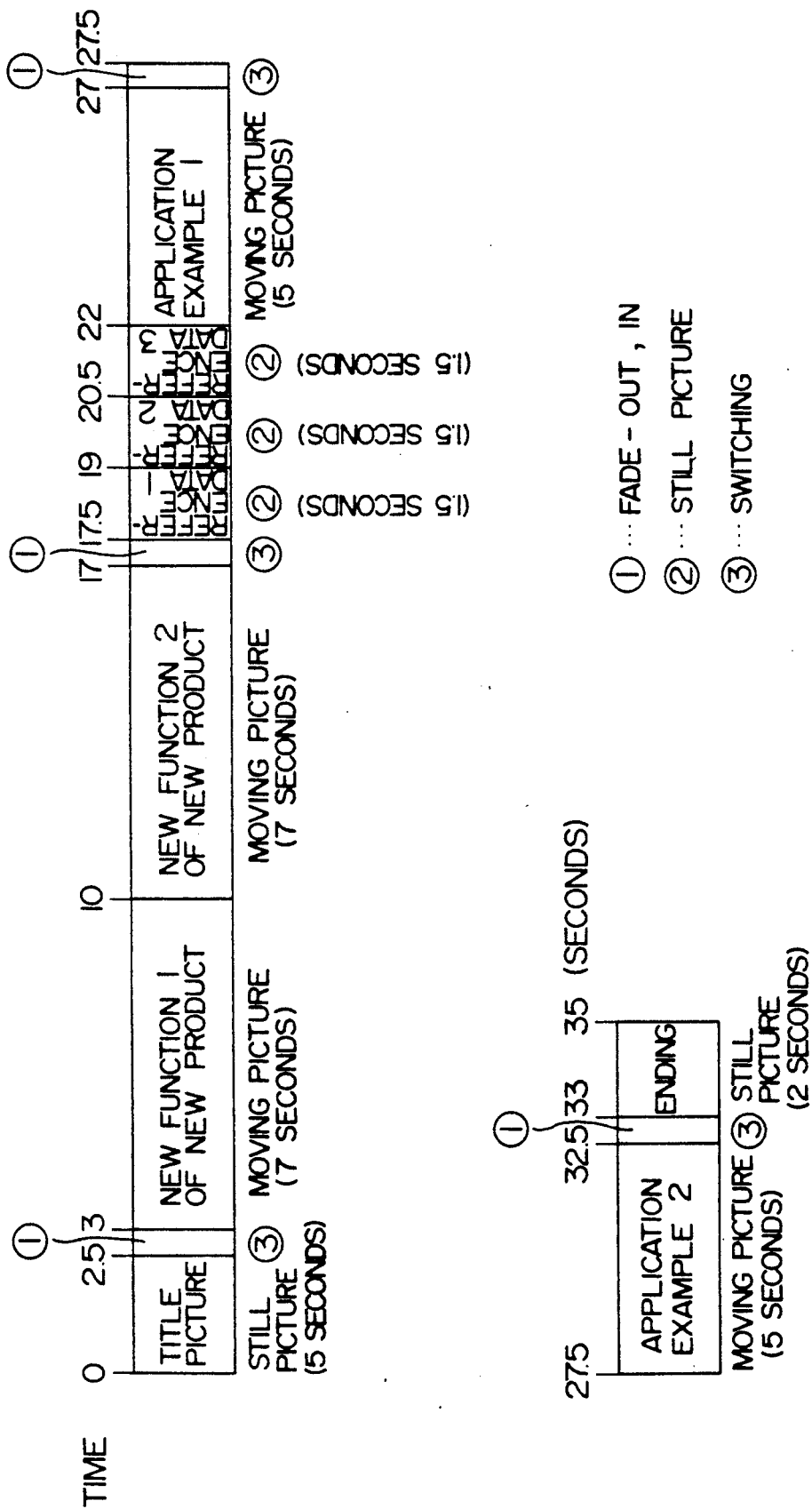

FIG. 3A

| PARTIAL NUMBER | ADJUSTMENT ALLOWANCE | MEDIUM | FILE NUMBER | EFFECT | TIME |
|---|---|---|---|---|---|
| 1 | 3 | STILL PICTURE SWITCHING | 32 | FADE-OUT, IN | 5 / 1 |
| 2 | 1 | MOVING PICTURE SWITCHING | 73  96 | DOWNWARD WIPE | 7 / 1 |
|   |   | MOVING PICTURE SWITCHING | 116  154 | FADE-OUT, IN | 7 / 2 |
| 3 | 5 | STILL PICTURE SWITCHING | 12 | LEFTWARD WIPE | 3 / 0.5 |
|   |   | STILL PICTURE SWITCHING | 11 | LEFTWARD WIPE | 3 / 0.5 |
|   |   | STILL PICTURE SWITCHING | 10 | LEFTWARD WIPE | 3 / 1 |
| 4 | 2 | MOVING PICTURE SWITCHING | 192  235 | FADE-OUT, IN | 5 / 1 |
|   |   | MOVING PICTURE SWITCHING | 316  342 | FADE-OUT, IN | 5 / 1 |
| 5 | 6 | MOVING PICTURE SWITCHING | 467  512 | FADE-OUT, IN | 8 / 2 |
| 6 | 4 | STILL PICTURE | 8 |  | 4 |
|   |   |   |   | TOTAL | 60 |

FIG. 3B

| PARTIAL NUMBER | ADJUSTMENT ALLOWANCE | MEDIUM | FILE NUMBER | EFFECT | TIME |
|---|---|---|---|---|---|
| 1 | 3 | STILL PICTURE | 32 | | 2.5 |
| | | SWITCHING | | FADE-OUT, IN | 0.5 |
| 2 | 1 | MOVING PICTURE | 73  96 | | 7 |
| | | MOVING PICTURE | 116  154 | | 7 |
| | | SWITCHING | | FADE-OUT, IN | 0.5 |
| 3 | 5 | STILL PICTURE | 12 | | 1.5 |
| | | STILL PICTURE | 11 | | 1.5 |
| | | STILL PICTURE | 10 | | 1.5 |
| 4 | 2 | MOVING PICTURE | 192  235 | | 5 |
| | | SWITCHING | | FADE-OUT, IN | 0.5 |
| | | MOVING PICTURE | 316  342 | | 5 |
| | | SWITCHING | | FADE-OUT, IN | 0.5 |
| 6 | 4 | STILL PICTURE | 8 | | 2 |
| | | | | TOTAL | 35 |

FIG. 4

| MEDIUM | | SWITCHING-TIME CHANGE | PRESENTATION SPEED CHANGE | THIN-OUT |
|---|---|---|---|---|
| SWITCHING | | FADE-OUT IN 0.5<br>DOWNWARD WIPE 0<br>UPWARD WIPE 0.3<br>LEFTWARD WIPE 0<br>RIGHTWARD WIPE 0.2 | | O |
| | STILL PICTURE | | TIME ×1/2 | O |
| | MOVING PICTURE | | TIME ×1/2 | O |

FIG. 6

| ADJUSTMENT ALLOWANCE | ADJUSTMENT PRIORITY LIMIT |
|---|---|
| 0 | 0 |
| MORE THAN 1 | 1 |
| MORE THAN 3 | 2 |
| MORE THAN 5 | 3 |

FIG. 7

| PARTIAL NUMBER | ADJUSTMENT ALLOWANCE | SWITCHING-TIME CHANGE | PRESENTATION SPEED CHANGE | THIN-OUT |
|---|---|---|---|---|
| 1 | 3 | 0.5 | 2.5 | 0 |
| 2 | 1 | 2.5 | 0 | 0 |
| 3 | 5 | 2 | 4.5 | 11 |
| 4 | 2 | 1 | 0 | 0 |
| 5 | 6 | 1.5 | 4 | 10 |
| 6 | 4 | 0 | 2 | 0 |

FIG. 9

| PARTIAL NUMBER | ADJUSTMENT ALLOWANCE | SWITCHING-TIME CHANGE | PRESENTATION SPEED CHANGE | THIN-OUT |
|---|---|---|---|---|
| 1 | 3 | 0.5 | 2.5 | 0 |
| 2 | 1 | 2.5 | 0 | 0 |
| 3 | 5 | ~~2~~ | ~~4.5~~ | 11 |
| 4 | 2 | 1 | 0 | 0 |
| 5 | 6 | ~~1.5~~ | ~~4~~ | 10 |
| 6 | 4 | 0 | 2 | 0 |

MASKED AREAS

FIG. 10A

| PARTIAL NUMBER | 5 | 3 | 6 | 1 | 4 | 2 | 5 | 3 | 6 | 1 | 4 | 2 |
|---|---|---|---|---|---|---|---|---|---|---|---|---|
| ADJUSTING METHOD PRIORITY | 1 | 1 | 1 | 1 | 1 | 1 | 2 | 2 | 2 | 2 | 2 | 2 |
| ADJUSTMENT TIME | 15 | 2 | 0 | 0.5 | 1 | 2.5 | 4 | 4.5 | 2 | 25 | 0 | 0 |

FIG. 10B

| PARTIAL NUMBER | 3 | 6 | 1 | 4 | 2 | 3 | 6 | 1 | 4 | 2 | 5 |
|---|---|---|---|---|---|---|---|---|---|---|---|
| ADJUSTING METHOD PRIORITY | 1 | 1 | 1 | 1 | 1 | 2 | 2 | 2 | 2 | 2 | 3 |
| ADJUSTMENT TIME | 2 | 0 | 0.5 | 1 | 2.5 | 4.5 | 2 | 25 | 0 | 0 | 10 |

PRESENTATION APPARATUS

BACKGROUND OF THE INVENTION

The present invention relates to a presentation apparatus which, when it is desired to finish the presentation of a plurality of all necessary study-material pictures in a limited period of time at such a speaking or lecturing place as a lecture meeting, can automatically adjust the presentation times of the respective material pictures to allow all the necessary pictures to be presented in the given time.

Conventional material presentation apparatuses used in conferences, lecture meetings and so on have been roughly classified into two types, i.e., a type in which respective materials are set and screened automatically in a previously prepared sequence as disclosed in JP-A-63-142386, and a type in which a lecturer or speaker manually presents her or his video material on the screen as in an overhead projector.

However, the prior art method has had such disadvantages that when it is required to change the limit time (which will be sometimes referred to as the presentation limit time, hereinafter) within which the lecturer has to present his video material for some reasons at the speaking or lecturing place, he must change the presentation speed of the video material or must quickly judge the situation on the spot and troublesomely manually set the projector to give up the presentation of part of the video material, and in the worst case, he cannot cope with its quickly.

SUMMARY OF THE INVENTION

It is an object of the present invention to provide a presentation apparatus which can automatically adjust a presentation limit time of a video material only by inputting a desired total lecture time to the apparatus, thereby ensuring the presentation of the video material always within a suitable time even at such a speaking or lecturing place as a lecture meeting where lecturer's total lecture time often tends to be changed for some reason.

A presentation apparatus of the present invention comprises video storage means for storing therein a plurality of video materials; an adjustment memory for storing therein at least a reading-out order of the video materials from said video storage means, standard presentation times of the video materials, and display methods; presentation means for sequentially reading out the video materials from the video storage means according to the data of the adjustment memory for screening; presentation-time input means for setting a desired total presentation time; subtraction means for calculating a difference between the desired total presentation time inputted from said presentation-time input means and a standard total presentation time calculated from the standard presentation times and for outputting the difference as an adjustment time; adjusting-method memory means for storing therein adjusting methods associated with the display methods of the video materials; and total-presentation-time adjustment means for selecting one of the adjusting methods from the adjusting method memory means according to the adjustment time received from the subtraction means and for rewriting the data of the adjustment memory to set the total presentation time to be equal to or smaller than the desired total presentation time.

The user as a speaker or lecturer inputs a desired display time to the presentation time input means according to the limited presentation time. The subtraction means calculates a difference (adjustment time) between the desired total presentation time inputted by the user and the standard total presentation time. The total presentation time adjustment means selects one of the adjusting methods associated with the display methods of the video material and stored the adjusting-method memory means and rewrites the data of the adjustment memory so that the total presentation time is equal to or smaller than the desired total presentation time.

For example, in the case where a wipe, through which the next video picture is switched from the top to the down during switching of the presentation material, is used as the display method, the total presentation time adjustment means adjusts the time of the each wipe according to the adjustment time and rewrites the data of the display method of the adjustment memory. Video pictures of less importance are thinned out, that is, the corresponding video data of the video material are deleted from the adjustment memory. When moving pictures are used as the video material, the display speed of the adjustment memory is rewritten.

As a result, the display method or the like can be automatically determined so that the presentation time can be set to be equal to or smaller than the desired display time, only by inputting the desired display time to the presentation time input means according to the limited presentation time of the user.

DESCRIPTION OF THE DRAWINGS

FIGS. 2A, 2B, 3A, 3B, 4, 6, 7, 9, 10A and 10B are diagrams for explaining the operation of the apparatus respectively;

DESCRIPTION OF THE PREFERRED EMBODIMENTS

Figure 1:
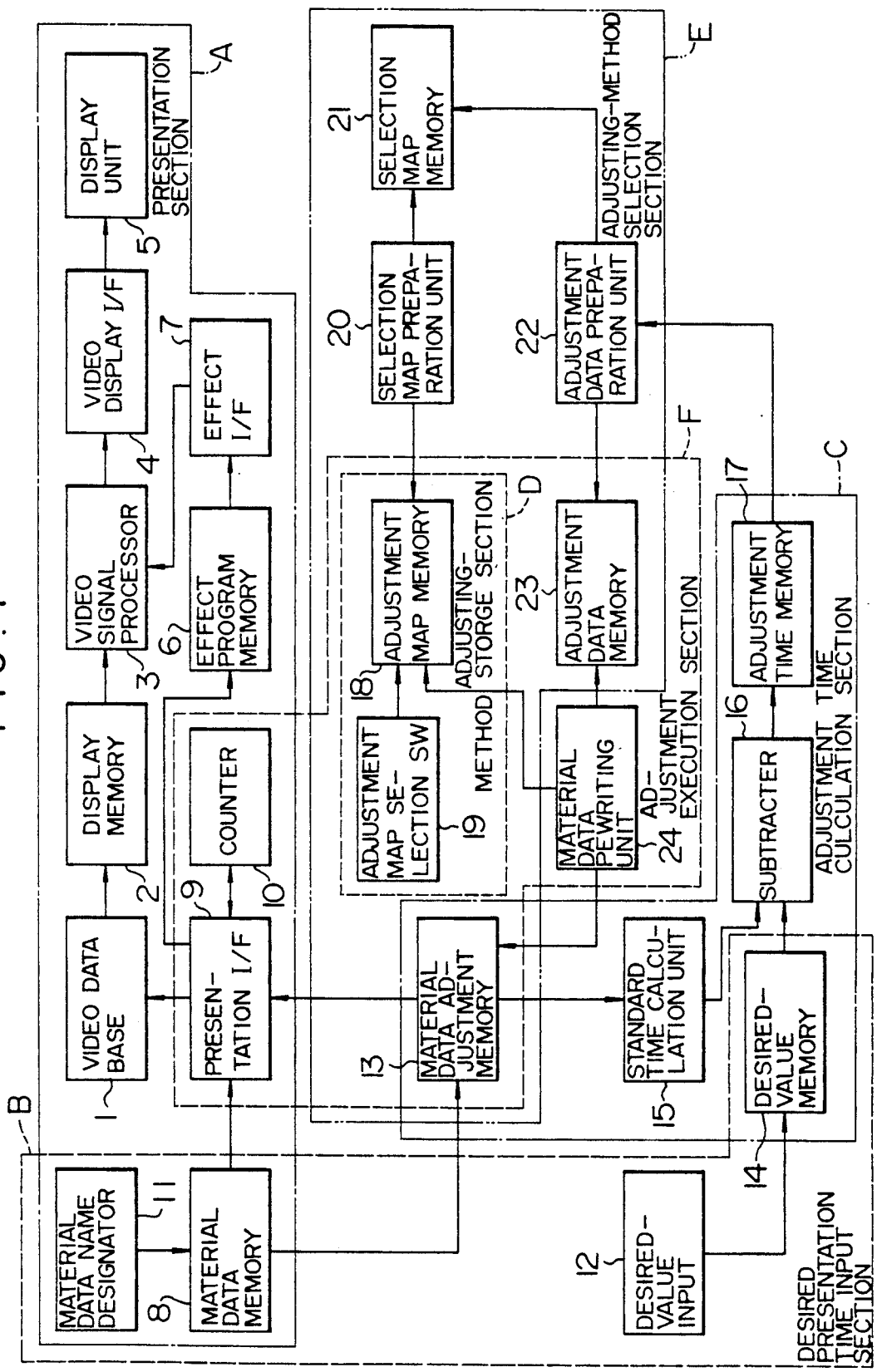
FIG. 1 is an arrangement of a presentation apparatus in accordance with a first embodiment of the present invention.

Referring first to FIG. 1, there is shown a block diagram of a presentation apparatus in accordance with a first embodiment of the present invention. The illustrated presentation apparatus comprises a presentation section A which saves therein as video works video pictorial materials necessary for presentation and displays them, a desired-presentation-time input section B which inputs a desired presentation limit time, an adjustment-time calculation section C which calculates an adjustment time corresponding to a difference between a standard (not adjusted) presentation limit time of the video materials and the desired presentation limit time, an adjusting-method storage section D which stores therein a plurality of adjusting methods having a plurality of priorities, an adjusting-method selection section E which selects desired one of the adjusting methods to be used according to the adjustment time and the priorities of the adjusting methods, and an adjustment executing section F which executes the selected adjusting method to realize the screened presentation of the adjusted video works within the desired time.

The details of the present invention will be explained by referring to FIGS. 2 to 9.

In the present embodiment, FIG. 2A shows an example in which a video material to be screened is adjusted by sequentially displaying moving and still pictures in the video material under the influence of visual effect of various video switching parts of the video material positioned between the moving and still pictures.

More specifically, in FIG. 2A, the video material is titled an identification name "NEW PRODUCT INTRODUCTION " and screened in the following sequence. That is, when the presentation is started, a title screen of still picture is first displayed for 5 seconds, and then the screen fades out (becomes gradually dark) and fades in (becomes gradually bright). One second later, a moving picture "NEW FUNCTIONS 1 OF NEW PRODUCT" appears and is displayed for 7 seconds. Subsequently, the moving picture is switched to the next moving picture "NEW FUNCTIONS 2 OF NEW PRODUCT" in one second and displayed for 7 seconds. The presentation of the video pictures proceeds like this. As shown by elapsed times given in the upper parts of the video material in the drawing, it usually takes 60 seconds to complete the presentation of the video material. In FIG. 2A and 2B, "* : Leftward wipe" means that the picture is switched to new one gradually from the right to the left of the screen under the influence of the visual effect.

In accordance with the present invention, when the presentation apparatus is set to change to 35 seconds the total presentation time of such a video material to be screened in 60 seconds as shown in FIG. 2A, the system automatically creates an adjusted video material having a total presentation time of 35 seconds as shown in FIG. 2B in the following sequences.

The above operation will be detailed in the following.

Such a material as shown in FIG. 2A or 2B is screened at the presentation section A. More in detail, the presentation section A includes such a video data base 1 as an optical disk unit, for example, which can suitably save a large number of still and moving pictures and can read out them therefrom at a high speed. The video data base 1 saves still pictures attached with their identification file numbers and saves moving pictures in a sequential file respectively in the form of a series of still pictures. When a file number is specified, a video data is loaded from the video data base 1 into a display memory 2 so that the video data in the display memory 2 is converted into a display data at a video display interface 4 and indicated on a display unit 5. The aforementioned visual effect at the time of video switching is provided at a video signal processor 3 disposed between the display memory 2 and the video display interface 4. More concretely, the video processor 3 specifies one of program files stored in an effect program storing memory 6 to provide the associated special effect to cause the specified program file to be sent from the memory 6 to an effect interface 7, whereby a look-up table or the like in the video signal processor 3 is controlled and the associated special effect is carried out.

The video material of FIG. 2A is constituted of a video data stored in the aforementioned optical disk and such a material data for extracting the stored video data as shown in FIG. 3A, the material data being saved in a material data storing memory 8. In FIG. 3A, the term "medium" refers to the sort of still or moving picture, or witching effect. That is, specification of the medium means the specification of whether to read out one file from the video data base 1 (still picture), to continually read out sequential files (moving picture) or to read out an effect program from the effect-program storing memory 6 (switching). The file address refers to the number of a video file containing a video data read out from the video data base. Thus, the specification of the file number means to specify the file number of a file containing a target video picture with respect to still pictures and to specify the start and end numbers of sequential files with respect to moving pictures. The specification of switching effect means to specify the name of a file containing target one of effect programs stored in the effect-program storing memory 6. The "time" given in FIG. 3A refers to the period of time, during which the specified still picture is displayed, the specified sequential files are displayed or the specified switching effect is displayed, respectively. Further, the "partial number" and "adjustment allowance" will be explained later. The material data, which is stored together with its material name applied thereto in the material-data storing memory 8 in such a manner as mentioned above, is converted at a presentation interface 9 into control signals. The control signals are then supplied from the memory 8 to the video data base 1 and the effect-program storing memory 6, while being subjected to a measurement of their output time period at a time counter 10.

The presentation-time input section B functions to specify a desired total presentation time to the video material to be screened, in order for the presentation section A to provide the desired presentation time.

A material-name specification unit 11 presents a list of material data names stored in the material-data storing memory 8 on its screen. The user elects one of the material data names to specify a desired material to be screened. This causes the specified material data to be loaded into a material-data adjustment memory 13. A desired-value input unit 12 is used to input a desired total presentation time within which it is desired to finish the presentation of the specified video material. The desired input presentation time is stored in a desired-value storing memory 14. For the purpose of finishing the presentation of such a video material as shown in FIG. 3A within 35 seconds, it is required that the user specifies one of the listed material names titled "NEW PRODUCT INTRODUCTION" and enters "35 seconds" from the desired-value input unit 12. This causes the material data of FIG. 3A to be leaded into the material-data adjustment memory 13 so that the "35 seconds" is stored in the memory 14.

The adjustment-time calculation section C is provided to calculate an adjustment time corresponding to a difference between a standard (not adjusted) presentation time and a desired time.

The loading of the material data into the memory 13 causes a standard-time calculating unit 15 to calculate its standard presentation time. The calculation of the standard time is carried out by adding together the "time" data in a column in FIG. 3A. More in detail, the calculating unit 15 recognizes the time data of the material-data adjustment memory 13 on a line-by-line basis and adds together the data to find a standard time. The found result (standard time) is sent from the unit 15 to a subtractor 16, when receiving the standard presentation time, reads out a desired presentation time from the desired-value storing memory 14 and subtracts the desired time from the standard one to fine an adjustment value. The found adjustment value is sent to an adjustment-value storing memory 17 and stored therein. In the case of the example of the material data shown in FIG. 3A, the standard-time calculating unit 15 calculates a standard presentation time of 60 seconds, the subtractor 16 subtracts 60 seconds from 35 seconds received from the desired-value memory 14 to find an adjustment time of 25 seconds, and the adjustment-value memory 17 stores the "25 seconds".

When the video document and the desired total presentation time are specified in such a manner as mentioned above, this automatically causes the system to calculate the adjustment value and to adjust the presentation time of the associated video material on the basis of the calculated adjustment value.

There are considered various methods of changing the presentation time of the video material, including changing the display speed, omitting some of pictures in the video material and so on. The adjusting-method storage section D is used to store therein many such adjusting methods.

The adjusting-method storage section D, more specifically, has an adjusting-method-map storing memory 18 which stores therein a detailed method of modifying material data for the purpose of providing a target adjustment.

In the case where there are present a plurality of such adjusting methods, priorities based on use order are provided to the respective adjusting methods. In the apparatus of the present embodiment, there are provided three adjusting methods of changing the time of switching effect (switching-time changing method), changing the presentation time of a still or moving picture (presentation-speed changing method), and omitting or thinning out some of the material data (thin-out method). In this connection, priority 1 refers to the switching-time changing method, 2 to the presentation-speed changing method, 3 to the thin-out method, respectively.

The adjusting-method-map storing memory 18 will be detailed by referring to FIG. 4.

The plurality of adjusting methods are stored in the method map memory 18 in such a table format as shown in FIG. 4. In the drawing, with respect to the "switching" medium of the priority 1, different time changes are designated for different switching effects. This means to change the time of a switching effect as mentioned above. More specifically, the switching effect "fade-out, in 0.2" in FIG. 2A means to set the switching time at 0.2 seconds when the fade-out, in switching effect is being used. The "downward wipe 0.3 seconds" given in Table of FIG. 4 means to set the time of the switching effect when upward wipe is used as the switching effect at 0.3 seconds.

The other visual effects are similarly designated with different switching times. With respect to the presentation time changing method of the priority 2, a presentation or display speed change is designated for still and moving pictures. More concretely, the "time×½" for still picture set forth in Table of FIG. 4 means that the display time can be arbitrarily changed up to ½ of the standard time; while the "time×½" for moving picture similarly means the display time can be arbitrarily changed up to double the standard time. With respect to the thin-out method of the priority 3, the display time is set at zero for any media. In other words, the part of the video material data having the priority 3 determined to be adjusted is thinned out. In this way, three of the switching-time and presentation-speed changing methods and the thin-out method are stored in the adjustment-map memory 18 as arranged in association with specific actions to the respective media in the priority order.

These adjusting methods are not limited to the above ones and may be also arbitrary in number. In addition, a plurality of such tables as explained above can be previously prepared to be selected by specifying one of these tables at an adjustment-map selecting switch 19.

In this way, when the priorities are applied to the plurality of adjusting methods and these methods are previously stored in the form of a table as associated with the actions of the associated media, the optimum adjustment can be always realized.

The adjusting-method selection section E is used to determine one of the adjusting methods to be used according to the adjustment time.

Generally speaking, the more quantity of adjustment to a video material causes the more different presentation from the standard case. A certain video material often requires that some parts of the material must be set at the standard presentation but other may be relatively freely set. The adjusting-method selection section E is arranged to be able to coping with even such a case.

The "partial number" and "adjustment allowance" given in the material data in FIG. 3A refer to the identification numbers of a plurality of sub-parts into which a video material is divided and to the degree of adjustment to be applied, respectively.

When adjustment allowances are designated to the divided parts of the video material data, the adjusting-method selection section E determines the adjustments to be applied to the respective division parts on the basis of the adjustment time and adjustment allowance. This operation will be detailed below.

The adjusting-method selection section E in FIG. 1 mainly includes a selection-map creating unit 20, a selection-map storing memory 21 and an adjustment-data creating unit 22. The map creating unit 20 calculates maximum times adjustable by respective adjusting methods with respect to the respective parts of material data, and creates a table having the partial numbers, adjustment allowances, adjusting methods and calculated times listed as associated with each other and stores the created table in the selection map memory 21 to select one of the adjusting methods. The adjustment-data creating unit 22 determines adjusting methods for the respective parts of the video material on the basis of the table on the map memory 21 to realize the desired presentation time.

Explanation will be made as to the operation of the selection-map creating unit 20 with reference to FIG. 5.

Figure 5:
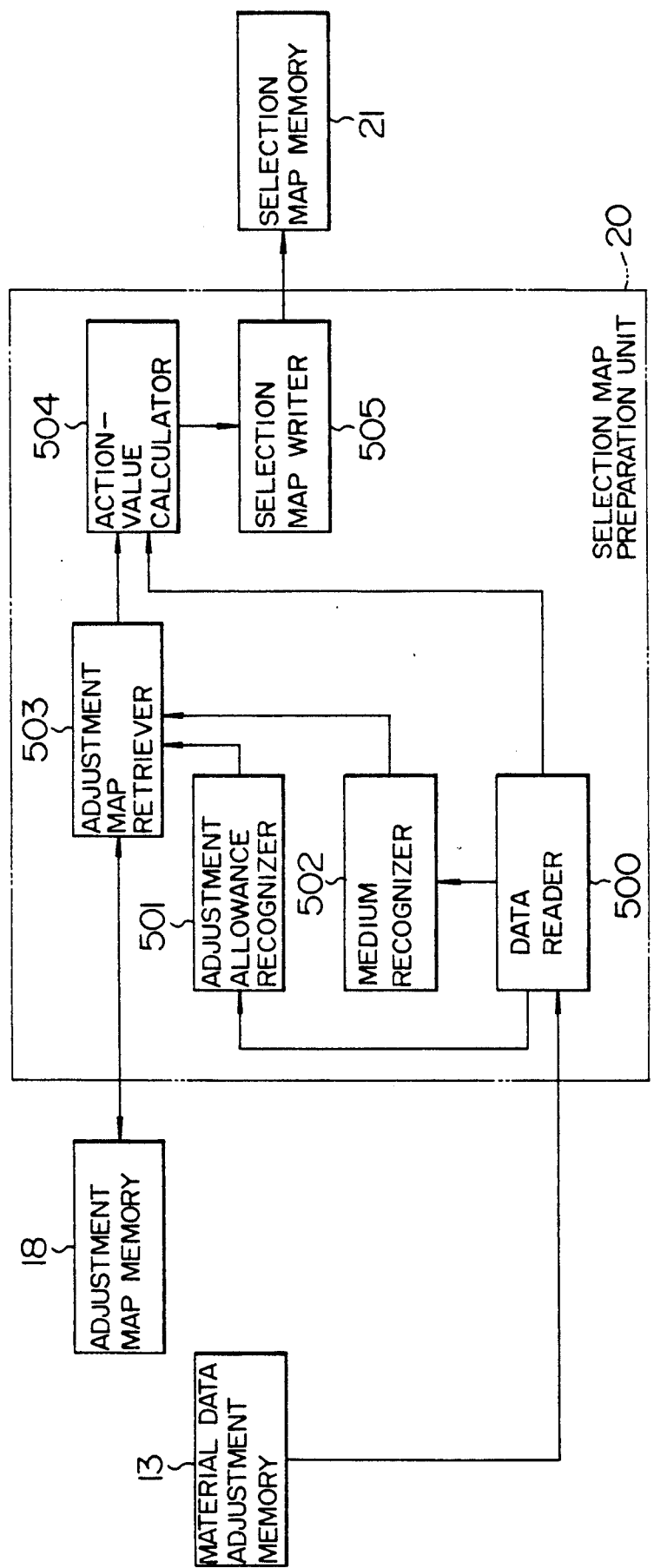
FIGS. 5 and 8 are details of parts of the apparatus of FIG. 1 respectively.

In FIG. 5, data reader 500 reads the material data on the material-data adjusting memory 13 on a line-by-line basis. An adjustment allowance recognizer 501 takes in the adjustment allowance of the data read at the data reader 500 and specifies the limit of the adjustment corresponding to the adjustment allowance. Correlations between the adjustment allowances and the adjusting methods are, for example, as shown in FIG. 6.

It will be seen from FIG. 6 that the material part having an adjustment allowance of 0 means that it is impossible to adjust the part, the material parts having adjustment allowances of more than 1 mean that the parts can be subjected to the adjustment of the priority 1 (switching-time changing method), the material parts having adjustment allowances of more than 3 means that the parts can be subjected to the adjustment of the priority 2 (presentation-speed changing method for still and moving pictures), and the material parts having adjustment allowances of more than 5 mean that the parts can be subjected to the adjustment of the priority 3 (thin-out method), respectively. The adjustment allowance recognizer 501 stores the correlations of FIG. 6 in its internal memory and outputs the adjustment limit corresponding to the taken-in adjustment allowance to an adjustment map retriever 503. A medium recognizer 502 identifies the medium of the material data in the data reader 500. The adjustment map retriever 503 retrieves from the table of the map memory 18 the action corresponding to the recognized adjusting method and identified medium name received from the adjustment allowance recognizer 501 and medium recognizer 502, and sends the retrieved action to an action-value calculator 504. The calculator 504 calculates the maximum times changeable for the material data of the data reader 500 corresponding to its lines on the basis of the actions for the associated adjusting methods, and sends them to a selection map writer 505. The writer 505 receives the changeable maximum time from the calculator 504, accumulates and the maximum times corresponding to lines belonging to one of the parts of the material data, adds together them for each of the adjusting methods to calculate a maximum time (which will be referred to as the partial action time, hereinafter) changeable for each of the respective adjusting methods in one part. The calculated values are written in the selection map memory 21 with the partial numbers and adjustment allowances attached thereto as associated with the adjusting methods.

In the case of the example shown in FIG. 3A, the table of FIG. 4 is stored in the adjustment map memory 21. When the adjustment allowance recognizer 501 specifies the adjustment limit based on FIG. 6, this causes the "partial number 1, adjustment allowance 3, still picture as medium, file number 32, time 5 seconds" on the first line of the table of FIG. 3A to be first read in the data reader 500. Since the adjustment allowance is 3, the adjustment allowance recognizer 501 informs the adjustment map retriever 503 of the fact that the adjustments of the switching-time and presentation-time changing methods can be allowed. The medium recognizer 502 informs the map retriever 503 of the fact that the medium is a still picture. The map retriever 503 retrieves from the table of FIG. 4 the fact that the presentation speed can be increased to a maximum 4 times the standard speed based on the presentation speed changing method, and sends it to the action-value calculator 504.

Since the standard display time of the still picture is 5 seconds and it is desired to set the action to the still picture to ½ when the display time is adjusted to the maximum, the action-value calculator 504 calculates 2.5 seconds (5−2.5 seconds) indicative of the fact that the display time can be adjusted by a maximum of 2.5 seconds and sends the calculated value to the selection map writer 505. Next, when the data on the second line in the table of FIG. 3A is read, this results in that, in the similar manner to the above, the display time can be adjusted by a maximum of 0.5 seconds because of the partial number 1, adjustment allowance 3 and switching-time changing method. Since the part of the material data having the partial number 1 corresponds to the above 2 lines of the table of FIG. 3A, the partial action time of the material part of the partial number 1 is 0.5 seconds for the switching-time changing method, 2.5 seconds for the presentation-time changing method and 0 seconds for the thin-out method, respectively.

When the above procedures are applied to the whole parts of the material data, such a table for selection of adjusting methods as shown in FIG. 7 is completed on the selection map memory 21.

When the selection table is prepared on the selection map memory in the manner mentioned above, the adjustment data creating unit 22 determines adjustments to be conducted for the respective parts of the material data. Explanation will next be made as to the operation of the adjustment data creating unit 22, by referring to FIG. 8.

Figure 8:
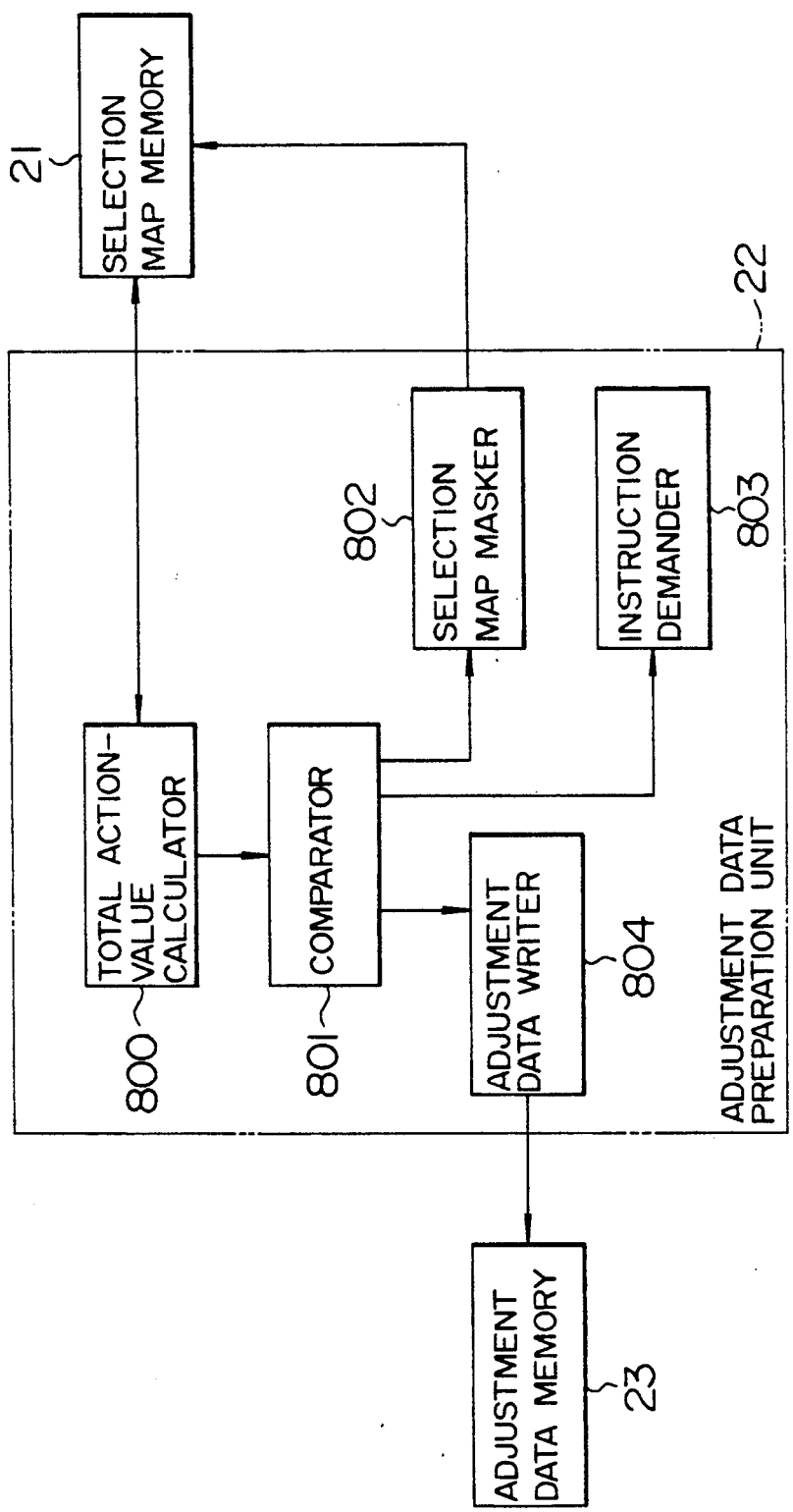

In FIG. 8, a summed-action-value calculator 800 sums, from the table in the selection map memory 21, partial action times corresponding to all the parts of the material data based on the switching-time changing method of the priority 1. In the case of the example of FIG. 7, the summed partial action time becomes 7.5 seconds. The value thus summed is sent from the calculator 800 to a comparator 801. The comparator 801 in turn, when receiving the summed value from the calculator 800, compares the summed value with the adjustment value stored in the adjustment-value memory. When the adjustment value is smaller than the summed value, the comparator 801 outputs a signal indicative of the permission of only the adjustment of the priority 1 to an adjustment data writer 804 and the control is transferred thereto. When the adjustment value is larger than the summed value, on the other hand, the comparator instructs the calculator 800 to calculate a total of partial action times corresponding to all the parts of the material data based on the adjustments until the next priority. In the above example, the adjustment value of the adjustment-value memory is "25 seconds" and thus the adjustment is impossible by means of only the switching-time changing method of the priority 1. The summed-action-value calculator 800, when receiving an instruction indicative of the aforementioned calculation, calculates a total of partial action times corresponding to all the parts based on the adjustments until the priority 2, that is, the switching-time and presentation-speed changing methods.

Since the switching-time and presentation-speed changing methods are different with respect to their media to be subjected to the adjustments and can be carried out independently of each other, it is only required to merely add together partial times corresponding to all the parts for the respective adjustments. In the case of the example of FIG. 7, a total time of 7.5 seconds for the switching time changing method is added to a total time of 13 seconds for the presentation-speed changing method. The total time thus calculated is again applied from the calculator 800 to the comparator 801 to be compared with the adjustment time. The foregoing procedures are repeated to judge the priority until which the adjustments enable the preparation of a material having a desired total presentation time. In the example of FIG. 7, since a total of the partial action times based on the adjustments until the priority 2 is 20.5 seconds and the adjustment time is 25 seconds, it is necessary to find a total of partial action times based on the adjustments until the priority 3. The adjustment of the priority 3 means to thin out the part in question. The part already subjected to the thin-out adjustment cannot be subjected to any switching-time or presentation-speed changing adjustments. Accordingly, partial action times of the switching-time and presentation-speed changing adjustments corresponding to the thin-out adjustment are masked as shown in FIG. 9 and the maximum time adjustable based on the adjustments until the priority 3 corresponds to a total of all the partial action times except for the masked partial action times. Such masking is carried out at a selection map mask 802. More in detail, the mask 802, according to an instruction from the summed-action-value calculator 800, masks all the partial action times of the switching-time and presentation-speed changing adjustments corresponding to non-zero partial action times of the thin-out adjustment.

The maximum time adjustable based on the adjustments until the priority 3 corresponds to the maximum time up to which the system of the present embodiment can adjust the presentation time. When it is required to perform the additional adjustment in order to realize a desired presentation time, this causes an instruction demander 803 to issue a message indicative of impossible adjustment to prompt the user to the next instruction.

In the above example, since the adjustment is 25 seconds and a total of all the action times other than those masked in FIG. 8 is 29.5 seconds, the adjustment is possible.

When the adjustment is determined possible, the control is transferred to the adjustment data writer 804. The writer 804 functions to sequentially prepare adjustment data in the adjustment-data memory 23 so that the adjustment can be carried out starting from the part having a larger adjustment allowance in the descending order of the priority.

Explanation will be made in connection with an adjustment value of 25 seconds as an example in FIG. 7. As shown in FIG. 10A, when parts having priorities 1 and 2 are subjected to adjustments in the descending order of the adjustment allowance, the adjustable time is 20.5 seconds. Because of shortage of the adjustable time, the adjustment of the priority 3 is performed over a part 6 having a highest adjustment allowance and correspondingly the adjustments of the priorities 1 and 2 over the part 6 are omitted. In this case, therefore, the adjustable time of FIG. 10B is 25 seconds and thus a desired presentation time can be realized. In the above example, the desired presentation time could be obtained only by adding together partial action times. If the presentation time has a fractional part, however, then parts to be subjected to the adjustment of the presentation-speed changing method can absorb the fractional part, because, when it is smaller then the respective partial action times, any value can be used.

In this way, an adjustment data is stored in an adjustment-data memory 23 so that one or ones of the adjusting methods realizing such a desired presentation time as shown in FIG. 3B is determined according to the priority and adjustment allowance to realize the adjustment based on user's intention.

The adjustment execution section F is provided to actually execute the adjusting method determined at the adjusting-method selection section.

A material-data rewriting unit 24 rewrites material data in the material-data adjustment memory 13 according to the data of the adjustment-data memory 23. Explanation will be made in connection with an example in which such material data as shown in FIG. 3A is to be rewritten with such adjustment data as shown in FIG. 10A. The material-data rewriting unit 24 first reads the adjustment data on the column-by-column basis and rewrites the partial numbers according to the table on the adjustment map memory 18 so as to satisfy the partial adjustment times of the adjustment time. With respect to the adjustment data on the first column in FIG. 10B, it means that the part having a partial number 3 is subjected to the adjustment of the priority 1 to adjust 2 seconds. Accordingly, the time of the "leftward wipe" switching effect on the part of the part number 3 is set to be zero, that is, the switching effect is eliminated. For the part of the partial number 3, there are three "leftward wipe" effects. For the 2-second adjustment, it is necessary to omit all the three effects and thus these three are adjusted. FIG. 3B is the result after completion of the rewriting operation of all the adjustment data of FIG. 10B in the manner mentioned above. The material data of FIG. 3B enables realization of the desired presentation time of 35 seconds. FIG. 2B shows the work when the material data of FIG. 3B is screened through the presentation section A.

As has been explained in the foregoing, the present apparatus can automatically adjust the presentation time of a material and can realize the presentation of the material within a desired presentation time only by inputting a material name to be screened and the desired presentation time thereof, whereby lecturer's burden due to the unexpected change of the presentation tie for some reason can be reduced to a large extent.

Figure 11:
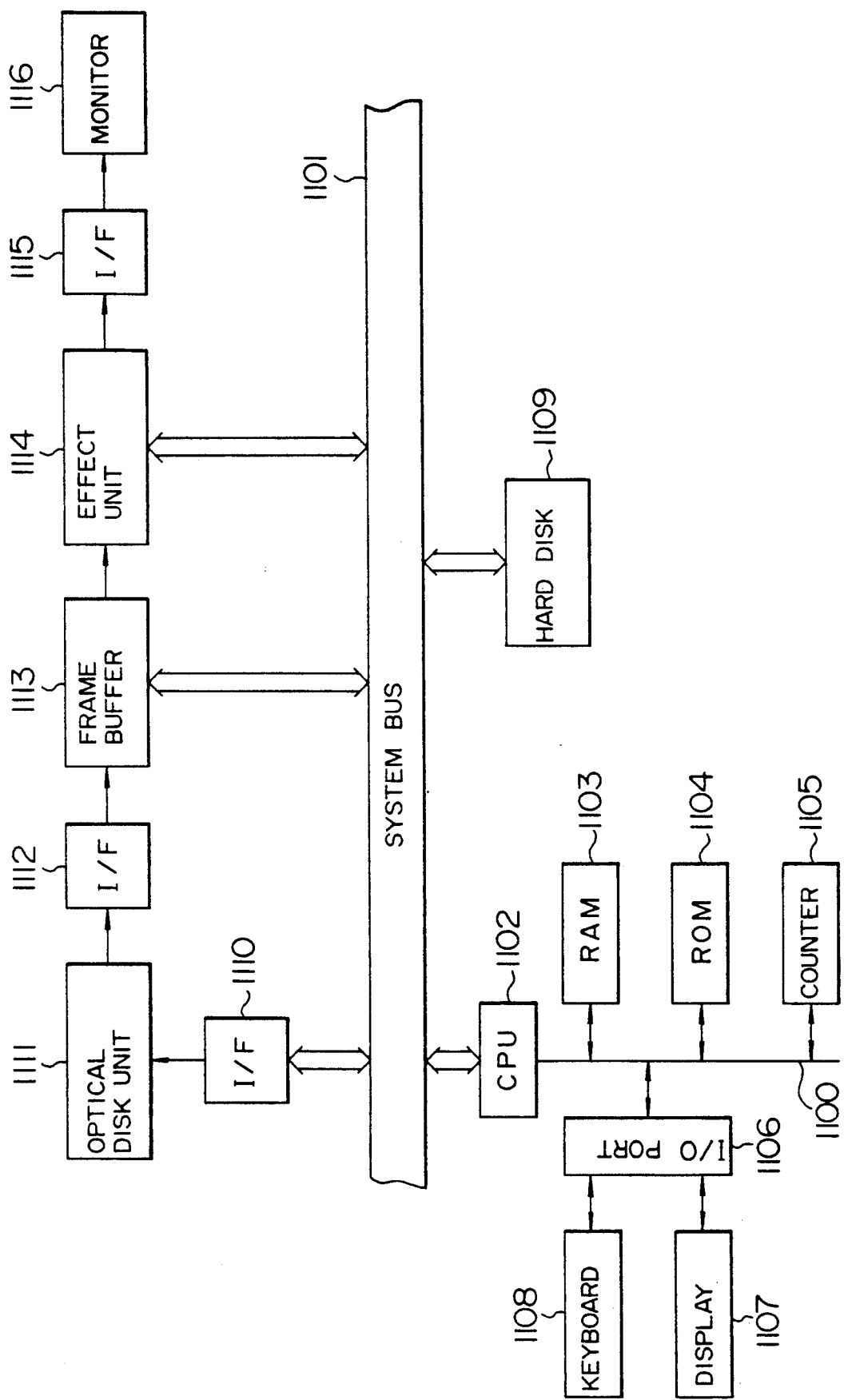
FIG. 11 is a block diagram of a presentation apparatus in accordance with a second embodiment of the present invention.
Figure 12:
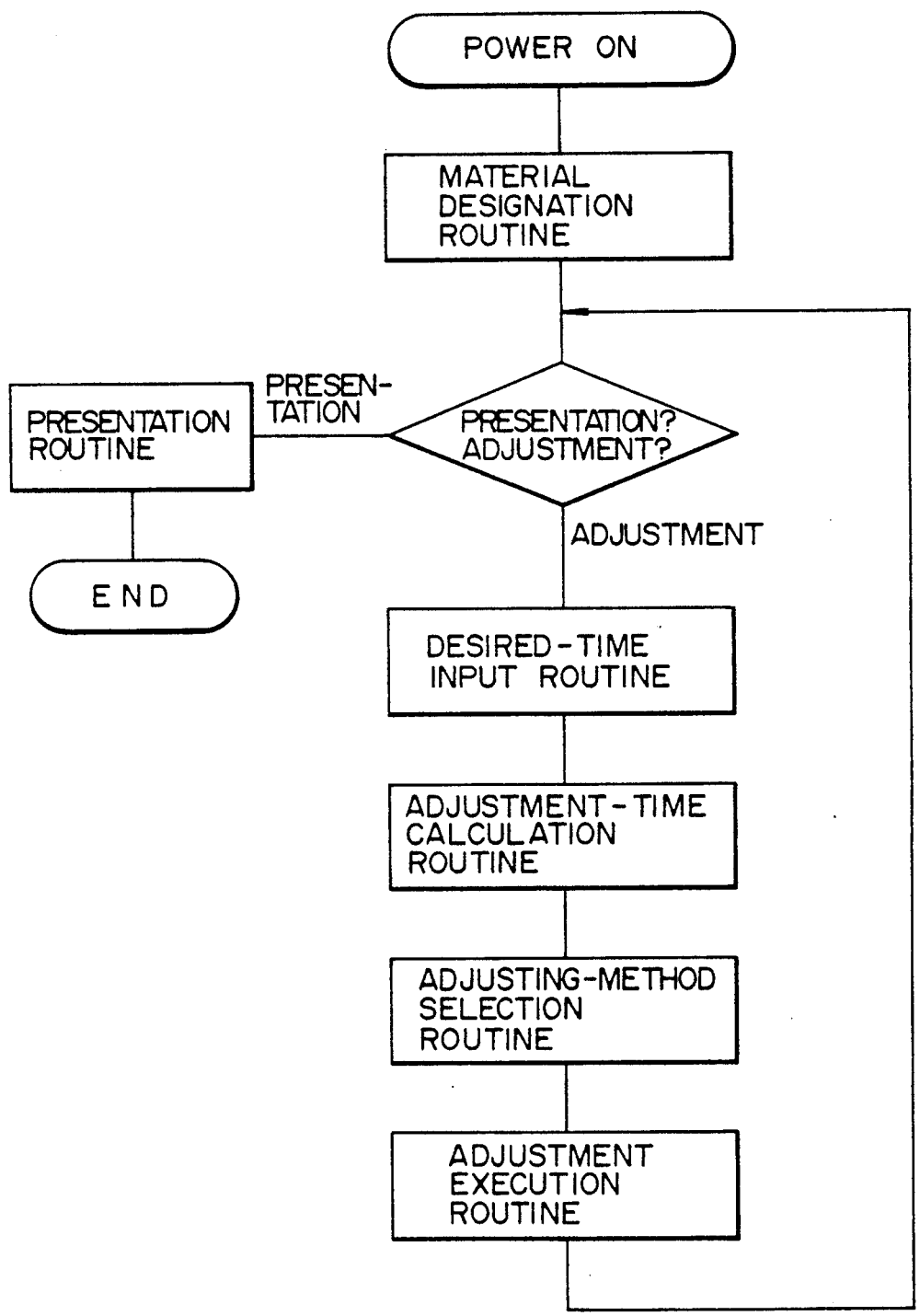
FIGS. 12 to 17 are flowcharts for explaining the operation of the apparatus of FIG. 11.

Shown in FIG. 11 is a presentation apparatus in accordance with another embodiment of the present invention, which comprises a system bus 1101, a personal computer system including a CPU 1102, a ROM 1104, a RAM 1103, an I/O interface 1106, a keyboard 1108, a display 1107, and so on, a hard disk 1109, an optical disk unit 1111 for video data base, a frame buffer 1113 for video processing, and a video effect unit 1114. The present apparatus of FIG. 11 is controlled according to the flowchart of FIG. 12 on software basis.

The present apparatus, like the first embodiment, includes a presentation routine, a desired-value input routine, an adjustment-time calculation routine, an adjusting-method storing routine, an adjusting-method selection routine, and an adjustment execution routine. A video material to be screened by the present apparatus has also such a structure having still and moving pictures and switching effect parts as shown in FIG. 2, and is extracted, switched and screened in the form of such material data as shown in FIG. 3.

The operation of the presentation apparatus of the present invention will be detailed by referring to FIGS. 12 to 17.

First of all, the presentation of the video material is carried out under control of the presentation routine. The material data to be screened are previously stored in the hard disk 1109. When a power supply is turned ON to activate the apparatus, the control program is executed to display all material data names present in the hard disk 1109 and the apparatus gets ready for user's input of desired one of the material data names. The user's input of the desired material data name causes the associated material data in the hard disk 1109 to be loaded into the RAM 1103. When the user desires to screen the specified material data as they are without any change, he or she inputs a presentation start instruction from the keyboard 1108; while, he desires to adjust the presentation time, he or she inputs an adjustment start instruction from the keyboard.

Figure 13:
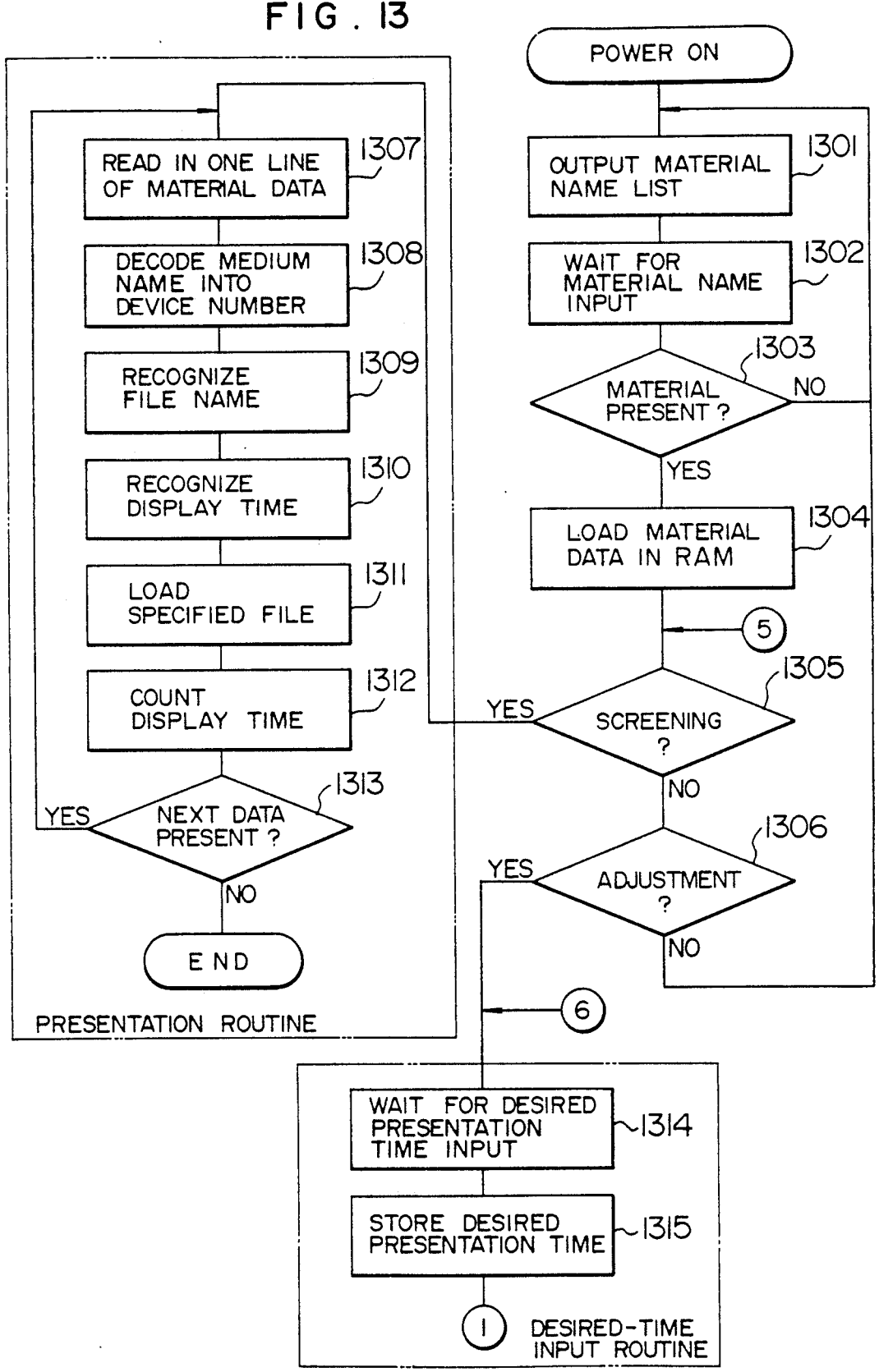

If the user inputs the presentation start instruction, this causes the presentation routine of FIG. 13 to be activated.

More in detail, the presentation routine is placed in the RAM 3 at a step 1307. The routine reads such material data as shown in FIGS. 3A and 3B on the line-by-line basis, discriminates the medium, decodes it into an activation control signal to the optical disk unit 1111 or video effect unit 1114, decodes the file name, and displays the target video or activates the target-effect switching program. The optical disk unit 1111 functions, as in the first embodiment, to save therein still pictures with their file identification names attached thereto and also to save moving pictures in the form of a series of still pictures in sequential files. The video effect unit 1114 switches the video material with various effects in accordance with the effect program (which executes various effects). With respect to the material data, the discrimination between the still picture, moving picture, and switching effect part are specified by the medium name, the still or moving picture to be displayed is specified by the file number, and one of the effect programs to be used in the hard disk 1109 is specified by the effect.

The presentation routine recognizes at a step 1308 the medium name for the device to be used. At a step 1309, the routine reads out from the material data the file number (one file to be displayed for the still picture and the start and end files of the series of sequential files to be continually displayed) or effect program name corresponding to the medium name recognized at the step 1308. The routine reads out "time" data from the material data at a step 1310. At a step 1311, the presentation routine loads the file or program read out at the step 1309 and at a step 1312 counts the display time through a time counter 1105. For the moving picture, it is displayed one at intervals of the "display time"/"the number of the specified sequential files".

The presentation of the video document according to the present apparatus is carried out as follows. When the user wants to adjust the presentation time prior to the starting of the presentation of the video material, the user specifies the material data at a step 1306 and then inputs an adjustment instruction from the keyboard 1108. This causes the apparatus to call the desired-value input routine of FIG. 13 to enter into its adjustment operation. The adjustment of the present apparatus refers to rewriting such material data as shown in FIG. 3A into such material data capable of being screened within the target time as shown in FIG. 3B. As shown in FIG. 13, at a step 1314, the desired-value input routine prompts the user to input a desired presentation time and the apparatus gets ready for user's input of a desired value. The user's input of the desired value through the keyboard 1108 causes the input value to be stored at a predetermined location in the RAM 1103 at a step 1315.

Figure 14:
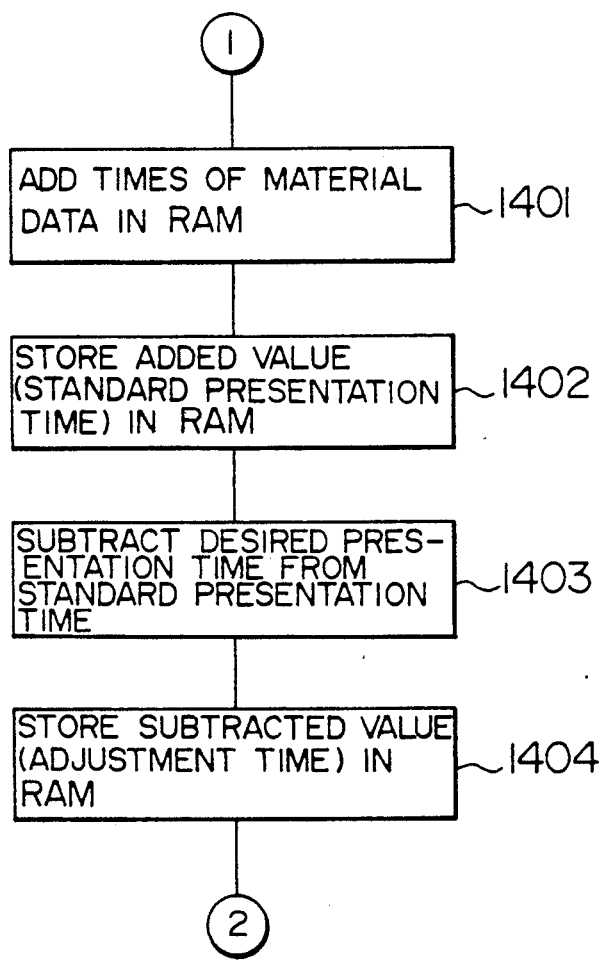

Next, the control is transferred to the adjustment time calculation routine shown in FIG. 14.

That is, in the drawing, the apparatus is operated as follows under the control of the calculation routine. More specifically, all the "time" data in the material data are added together to its standard presentation time. At a step 1402, the calculated standard presentation time is stored in the RAM 1103 at its predetermined location at a step 1402. The desired presentation time is subtracted from the standard presentation time at a step 1403 to find an adjustment time and then stored in the RAM 1103 at a step 1404.

Next, the adjusting-method selection routine is used to select the adjustment time to be used.

Adjusting methods having priorities for realizing the desired presentation time are saved in the ROM 1104 in the form of such a table as shown in FIG. 4 as in the first embodiment. The adjusting methods saved in the ROM 1104 are selected and executed according to the priority to perform the adjusting operation.

Figure 15:
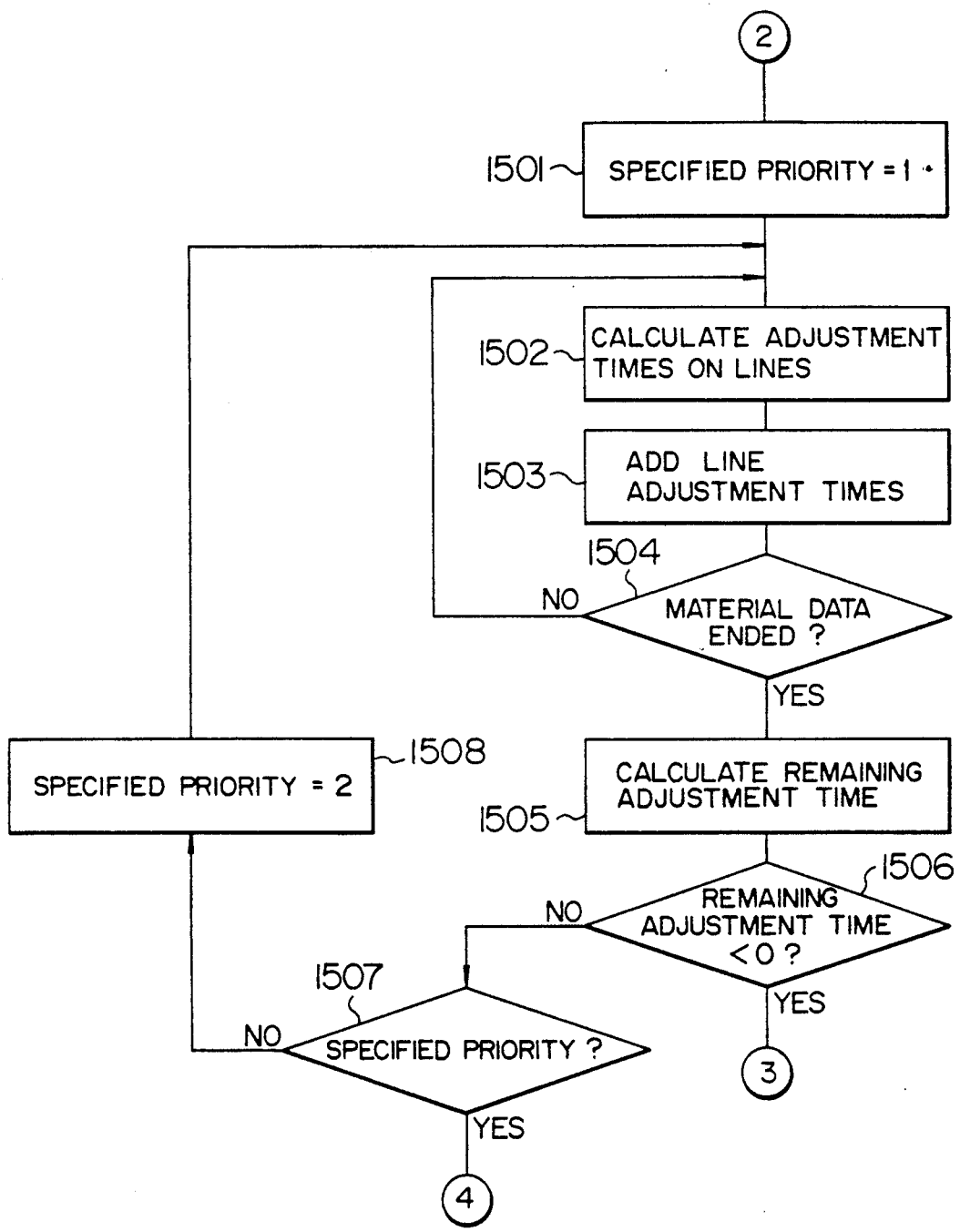

FIG. 15 shows the adjusting-method selection routine. This routine consists of a fine adjustment routine and a coarse adjustment routine. The fine adjustment routine acts to determine the use of the switching-time changing adjustment of the priority 1 or the presentation-speed changing adjustment of the priority 2; while the coarse adjustment routine acts to select the thin-out adjustment of the priority 3. The presentation apparatus is operated under the control of the adjusting-method selection routine as follows.

More specifically, the switching-time method is specified at the first step. At a step 1502, adjustment times for respective lines based on the adjusting method of the priority specified at the step 1501 are calculated. The calculated adjustment times are sequentially added at a step 1503 the adjustment times of all the lines of the material data are added together to find an adjustable time by the adjusting method of the priority 1 at a step 1504. At a step 1505, the time calculated at the step 1503 is subtracted from the adjustment time calculated under the adjustment-time calculation routine to find a remaining adjustment time. When the calculated remaining adjustment time is larger than zero, the control is moved to a step 1508 because only the adjustment of the priority 1 results in a sufficient adjustment time. If the remaining adjustment time is equal to or smaller than zero, then the control is transferred to the next adjustment work routine because only the adjustment of the priority 1 enables the realization of the desired adjustment time. After the priority is set to be 2 at the step 1508, the control is returned to the step 1502, after which, the same operations as mentioned above are repeated to calculate an adjustable time based on the adjusting method of the priority 2. The calculated value is further subtracted from the aforementioned remaining adjustment time remaining at the step 1503 to check whether or not the adjustment is possible based on the adjustments of the priorities 1 and 2. When the subtraction is equal to or smaller than zero, the control is transferred to the adjustment work routine; whereas, when the subtraction is larger than zero, the control is passed through the step 1501 and then moved to the coarse adjustment routine.

Figure 16:
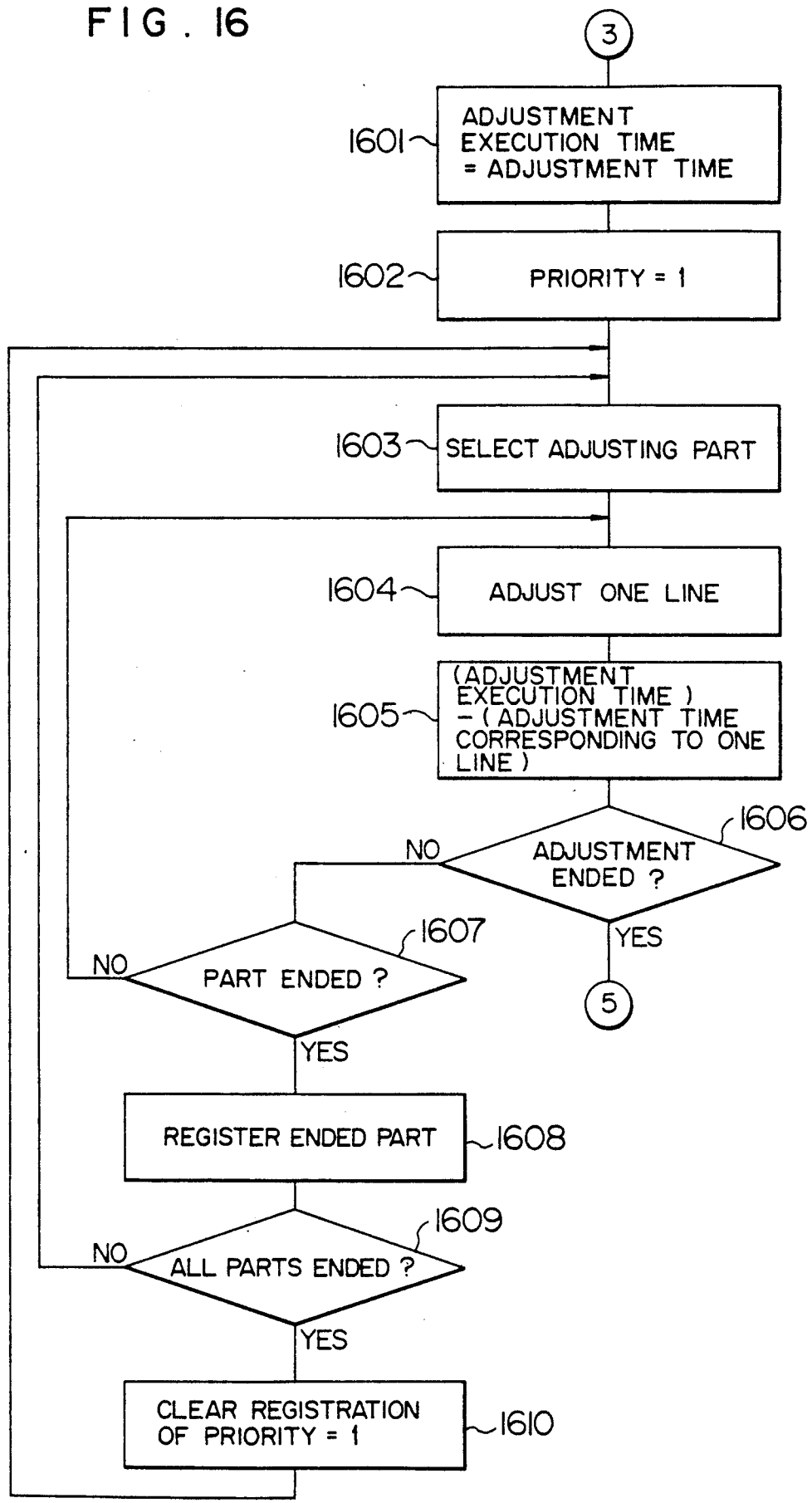
Figure 17:
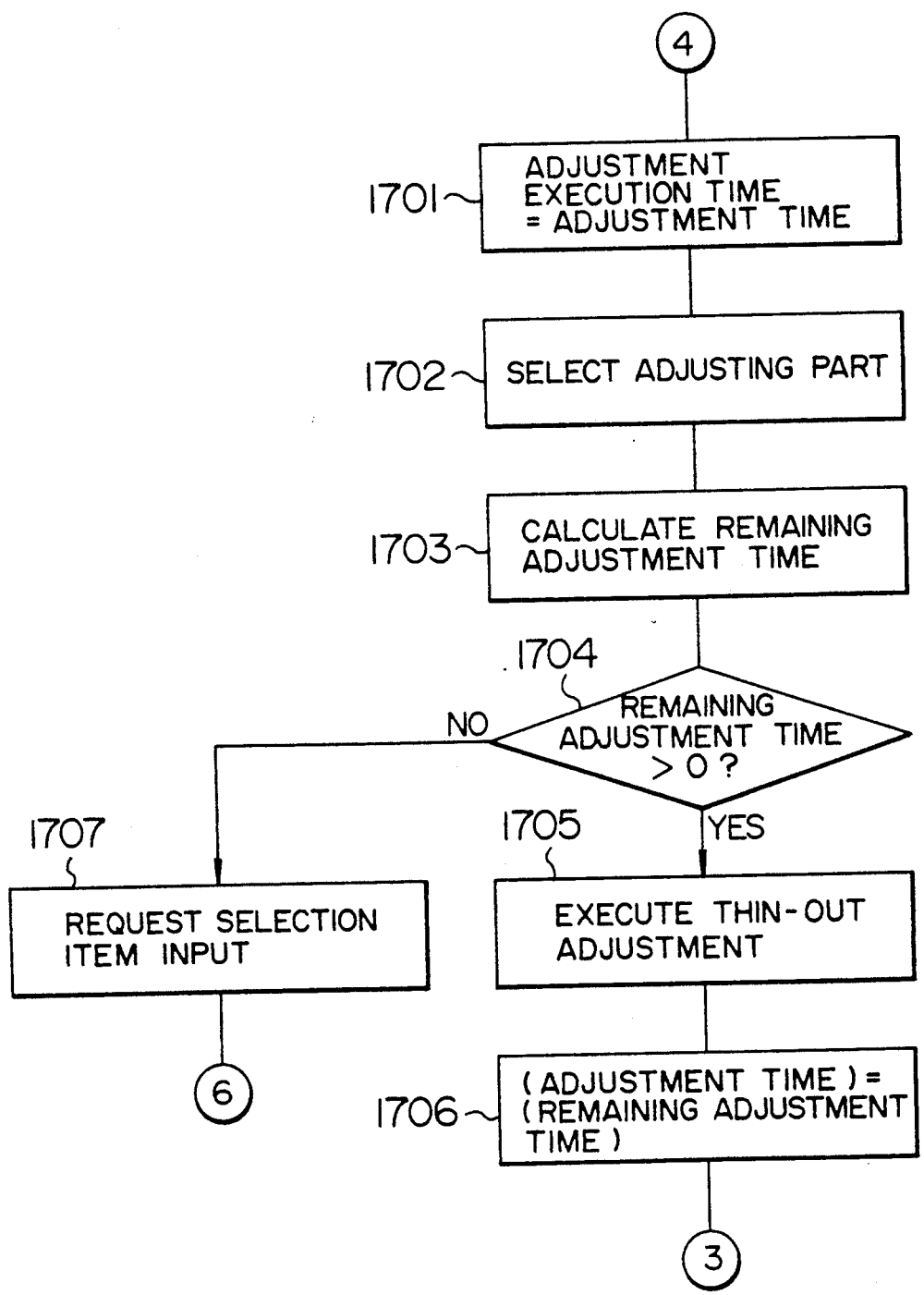

Referring to FIGS. 16 and 17, there is shown a flowchart of the adjustment execution routine. The part of the flowchart of FIG. 16 is for the purpose of performing fine adjustment. When the adjustment is judged to be adjustable based on the fine adjustment according to the flowchart of FIG. 15, the control is transferred to the adjustment execution routine. First, at a step 1601 of FIG. 16, the adjustment time saved in the RAM 3 is entered as the initial value of the adjustment execution time. The switching-time changing method of the priority 1 is specified at a step 1602. At the next step 1603, one of the adjustable parts not subjected to the switching-time changing method yet, which has the largest adjustment allowance is selected. At steps 1604 to 1606, the selected part is rewritten on the line-by-line basis according to the adjustment map (refer to FIG. 4) of the ROM 1104 so that a time reducible the adjustment for every line rewriting operation is calculated and sequentially subtracted from the adjustment execution time. When the adjustment execution time reaches zero, this means the end of the adjustment. At the step 1606, it is judged on the basis of the adjustment execution time whether or not the adjustment is completed. If the adjustment is not completed yet, then the presence of absence of the remained line or lines of the selected part not subjected to the adjustment is checked at a step 1607. If the line presence is determined at the step 1607, then the control is returned to the step 1604 for adjustment of the next line. When the adjustment of the selected part about all the lines is competed, the adjustment completed part is registered as completed with respect to the adjustment at a step 1608.

At a step 1609, it is checked, on the basis of the registered part and the priority of the adjusting method, whether or not all the adjustable parts are already adjusted. The determination of the presence of any adjustable parts causes the control to return to the step 1603 to continue the adjustment. When it is determined at the step 1609 that all the adjustable parts are already adjusted, the presentation speed changing method of the priority 2 is specified, the registration of the adjustment completion is cancelled, and the control returns to the step 1603 to continue the adjustment. Since it is already judged through the adjusting-method selection routine of FIG. 15, the adjustment is possible through the fine adjustment, it is certain that the adjustment is finished prior to performing the presentation-speed changing adjustment over all the parts. As in the first embodiment, the relationships between the priorities of the adjusting methods and the adjustment allowances of the respective parts of the material data are shown in FIG. 6. When it is judged in the adjusting-method selection routine that the adjustment requires the coarse adjustment, the control is transferred to the coarse adjustment routine. FIG. 17 is a flowchart of the coarse adjustment routine.

When the coarse adjustment is required, the adjustment time in the RAM 1103 is entered at a step 1701 as the initial value of the adjustment execution time. Of the respective parts of the adjustment allowances, the part which can be subjected to the coarse adjustment and has the largest adjustment allowance is selected at the next step 1702. At a step 1703, a reducible presentation time is calculated when the part selected at the step 1702 is thinned out, and the calculated value is subtracted from the adjustment execution time to find a remaining adjustment time. When the remaining adjustment time found at the step 1703 is larger than zero at a step 1704, the control goes to a step 1705 where all the data (about the partial number, adjustment allowance, medium file number, effect and time) of the selected part are erased and thinned out. At the next step 1706, the adjustment time in the RAM 1103 is rewritten into the remaining adjustment time calculated at the step 1703 and the control is transferred again to the adjusting-method selection routine of FIG. 15. When the remaining adjustment time is equal to or smaller than zero at the step 1704, even any combination of the respective adjusting methods disables realization of the adjustment. In this case, the remaining adjustment time is indicated on the display 1107 and at the same time, a message is issued to the user to prompt the user to input a new desired presentation time at a step 1707, after which the control is transferred to the step 1305 of FIG. 13 to retry the adjusting work.

In such a manner as mentioned in the foregoing, the selection and execution of adjusting methods are repeated and eventually the material data are rewritten into desired data which can realize the desired presentation time and can get ready for its screening or projection.

Although such data stored in the material data memory 8 as the standard presentation time have been once transferred to the material-data adjustment memory 13 and then the data of the memory 13 has been rewritten according to the adjustment in the first embodiment, the data in the material-data memory may be directly rewritten. In the latter case, in order to set the presentation time at the first determined standard pattern one, the user must again enter the data. In the second embodiment, the presentation time pattern can be returned to the standard pattern only by again loading the data from the memory 1109.

In accordance with the present invention, as has been explained in the foregoing, only the input of the name of a video material to be projected and the input of a desired presentation time therefor enables the automatic realization of presentation of the video material within the desired presentation time. As a result, even in the event where the user must suddenly change his presentation time without any previous notice at such a speaking or lecturing place as a lecture meeting, the user can proceed the presentation of his video material without substantially changing the contents of the material. In addition, since one or ones of a plurality of adjusting methods to be used are selected according to the desired presentation time, the present invention can realize the adjustment always satisfying user's intention.

We claim:

1. A presentation apparatus comprising:
   video storage means for storing therein a plurality of video materials;
   an adjustment memory for storing therein at least a reading-out order of said video materials from said video storage means, standard presentation times of the video materials, and display methods;
   presentation means for sequentially reading out the video materials from said video storage means according to the data of said adjustment memory for screening;
   presentation-time input means for setting a desired total presentation time;
   subtraction means for calculating a difference between said desired total presentation time inputted from said presentation-time input means and a standard total presentation time calculated from said standard presentation times and for outputting said difference as an adjustment time;
   adjusting-method memory means for storing therein adjusting methods associated with said display methods of the video materials; and
   total-presentation-time adjustment means for selecting one of said adjusting methods from said adjusting method memory means according to said adjustment time received from said subtraction means and for rewriting the data of said adjustment memory to set said total presentation time to be equal to or smaller than said desired total presentation time.

2. A presentation apparatus as set forth in claim 1, wherein said adjusting-method memory means stores therein at least two or more of said adjusting methods for each of said display methods, each of the adjusting methods having a priority, said total-presentation-time adjustment means selects the adjusting methods in an descending order of said priority.

3. A presentation apparatus as set forth in claim 1, wherein said adjusting methods stored in said adjusting-method memory means include at least an adjusting method for changing the presentation time of the each video material.

4. A presentation apparatus as set forth in claim 2, wherein said adjusting methods stored in said adjusting-method memory means include at least an adjusting method for changing the presentation time of the each vide material.

5. A presentation apparatus as set forth in claim 1, wherein said adjusting methods stored in said adjusting-method memory means include at least an adjusting method for thinning out the video material to be screened.

6. A presentation apparatus as set forth in claim 2, wherein said adjusting methods stored in said adjusting-method memory means include at least an adjusting method for thinning out the video material to be screened.

7. A presentation apparatus as set forth in claim 1, wherein said adjusting methods stored in said adjusting-method memory means include at least an adjusting method for changing the video material to be screened.

8. A presentation apparatus as set forth in claim 2, wherein said adjusting methods stored in said adjusting-method memory means include at least an adjusting method for changing the video material to be screened.

9. A presentation apparatus as set forth in claim 1, wherein said adjusting methods stored in said adjusting-method memory means include at least an adjusting method for changing a presentation method when the video material to be screened is to be switched.

10. A presentation apparatus as set forth in claim 2, wherein said adjusting methods stored in said adjusting-method memory means include at least an adjusting method for changing a presentation method when the video material to be screened is to be switched.

11. A presentation apparatus as set forth in claim 1, wherein said adjusting methods stored in said adjusting-method memory means include at least an adjusting method for changing the presentation time when the video material to be screened is to be switched.

12. A presentation apparatus as set forth in claim 2, wherein said adjusting methods stored in said adjusting-method memory means include at least an adjusting method for changing the presentation time when the video material to be screened is to be switched.

13. A presentation apparatus as set forth in claim 1, wherein said total presentation-time adjustment means issues an adjustment disable message when it is impossible to set said total presentation time to be equal to or smaller than said desired total presentation time even for any selection of the adjusting methods from said adjusting means.

14. A presentation apparatus comprising:
video storage means for storing therein a plurality of video materials;
a first adjustment memory for storing therein at least a reading-out order of said video materials from said video storage means, standard presentation times of the video materials, and display methods;
presentation-time input means for setting a desired total presentation time;
subtraction means for calculating a difference between said desired total presentation time inputted from said presentation-time input means and a standard total presentation time calculated from said standard presentation times and for outputting said difference as an adjustment time;
adjusting-method memory means for storing therein adjusting methods associated with said display methods of the video materials;
total-presentation-time adjustment means for selecting one of said adjusting methods from said adjusting method memory means according to said adjustment time received from said subtraction means and for rewriting the data of said adjustment memory to set said total presentation time to be equal to or smaller than said desired total presentation time and for storing therein said rewritten data in a second adjustment memory; and
presentation means for sequentially reading out said video materials from said video storage means according to the data stored in said second adjustment memory for screening.

15. A presentation method comprising the steps of:
storing a plurality of video materials in video storage means;
storing in an adjustment memory at least a reading-out order of said video materials from said video storage means, standard presentation times of the video materials, and display methods;
storing adjusting methods associated with display methods of the video materials in adjusting-method memory means;
inputting a desired total presentation time from presentation time input means;
calculating a difference between said desired total presentation time inputted from said presentation-time input means and a standard total presentation time calculated from said standard presentation times and outputting said difference as an adjustment time; and
selecting one of said adjusting methods from said adjusting method memory means according to said adjustment time and rewriting the data of said adjustment memory to set said total presentation time to be equal to or smaller than said desired total presentation time.

16. A presentation method comprising the steps of:
storing a plurality of video materials in video storage means;
storing in a first adjustment memory at least a reading-out order of said video materials from said video storage means, standard presentation times of the video materials, and display methods;
storing adjusting methods associated with display methods of the video materials in adjusting-method memory means;
inputting a desired total presentation time from presentation time input means;
calculating a difference between said desired total presentation time inputted from said presentation-time input means and a standard total presentation time calculated from said standard presentation times and outputting said difference as an adjustment time;
selecting one of said adjusting methods from said adjusting method memory means according to said adjustment time and rewriting the data of said adjustment memory to set said total presentation time to be equal to or smaller than said desired total presentation time;

storing said rewritten data in a second adjustment memory; and sequentially reading out the video materials from said video storage means according to the data stored in said second adjustment memory means for screening.

17. A presentation apparatus comprising:

means for storing a plurality of video materials in video storage means;

means for storing in a first adjustment memory at least a reading-out order of said video materials from said video storage means, standard presentation times of the video materials, and display methods;

means for storing adjusting methods associated with display methods of the video materials in adjusting-method memory means;

means for inputting a desired total presentation time from presentation time input means;

means for calculating a difference between said desired total presentation time inputted from said presentation-time input means and a standard total presentation time calculated from said standard presentation times and outputting said difference as an adjustment time;

means for selecting one of said adjusting methods from said adjusting method memory means according to said adjustment time and rewriting the data of said adjustment memory to set said total presentation time to be equal to or smaller than said desired total presentation time;

means for storing said rewritten data in a second adjustment memory; and means for sequentially reading out the video materials from said video storage means according to the data stored in said second adjustment memory means for screening.

* * * * *